Figure 1:
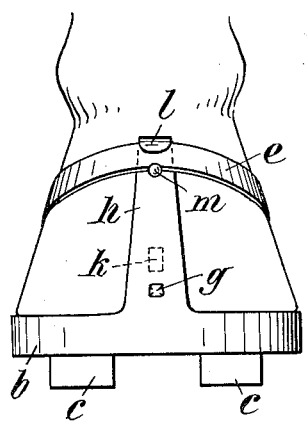

Oct. 6, 1936.   M. STEINMETZ   2,056,373

HORSESHOE

Filed March 20, 1935

Inventor:

Michel Steinmetz

By Chatwin & Company. Attys.

Patented Oct. 6, 1936

2,056,373

UNITED STATES PATENT OFFICE 2,056,373

HORSESHOE

Michel Steinmetz, Bollendorf, Eiffel, Reg. Bez. Trier, Germany

Application March 20, 1935, Serial No. 12,044
In Germany May 20, 1933

1 Claim. (Cl. 168—4)

The invention relates to a horse-shoe which is fastened to the hoof without the use of nails. Horse-shoes which are fastened to the hoof solely by teeth, prongs or similar fastenings have already been made known. Such horse-shoes have however the disadvantage that they damage the wall of the hoof, as the individual teeth must be inserted to an appropriate depth into the wall of the hoof in order to ensure the firmness of the shoe.

It has further become known to use horse-shoes in which a tightening or tension band is placed on both sides of the horse-shoe, this band directly enclosing the hoof. The tightening band is fastened at the toe-cap or front end of the shoe by screws. In this kind of fastening however points and teeth at the sides are unavoidable on the shoe, in order that the shoe shall be made secure against twisting and displacement from its position. This kind of fastening of the shoe however was not secure enough on the hoof, or, if screwed up tight, caused lameness to the animal.

In accordance with the invention use is made of a shoe which precludes such lameness and damaging of the wall of the hoof, but nevertheless, with a shoe of small weight, ensures safe and firm fastening. For this purpose a tightening band is placed in the extended toe-cap or front end and passed over the rigid, raised sides to the rear ends of the sides of the horse-shoe. The tightening band is adjustably mounted in holes with its free ends in the extended end of the head of the shoe sides. The toe-cap is rolled out thin at its free end and bent over the tightening band to serve as an upper guide, while a button or knob mounted on the toe-cap or front end serves as a lower guide. The ends of the tightening band are secured by means of spindle nuts. In the toe part or front end itself, nail-holes can be provided in order, if desired, to make it possible for the shoe to be secured in a vertical direction, which is however not absolutely necessary.

Through the formation of the shoe in accordance with the invention, the known disadvantages are completely eliminated, and it is made possible for horses suffering from hoof troubles to be quite fit again after a short time by fitting these shoes. The shoe according to the invention in every respect takes into consideration the mechanism and the growth of the hoof. It permits a good circulation of blood to the hoof and its tightening band does not restrict the circulation as the raised sides do not affect the circulation at the most sensitive parts of the hoof. The fastening of the shoe by the tightening band is flexible, which effect is particularly achieved by the guiding at the toe-cap or front end. The adjustability of the tightening band at the extended head ends of the shoe makes impossible the cramping of the quarters ends of the hoof.

In the drawing the object of the invention is shown in one example of construction.

Figure 2:
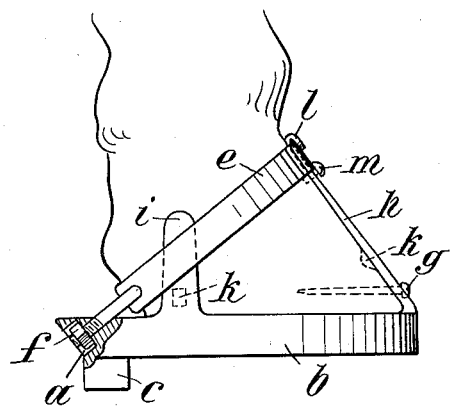
Figure 4:
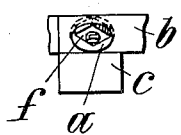
Figure 3:
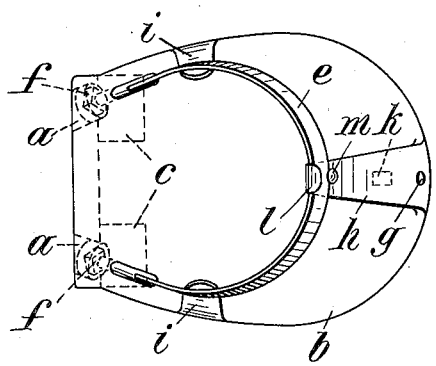

Fig. 1 shows a front view.
Fig. 2 shows a side view.
Fig. 3 shows a view of the rear ends of the shoe.
Fig. 4 shows an end view of the rear part of one side of a horse-shoe.

The shoe $b$ has an extended toe-cap or front end $h$ and rigid raised sides $i$. The tightening or tension band $e$ passes over the toe part or front end $h$, held in its position from above by the toe-cap $l$ which is rolled out thin and bent over the tightening band. A button $m$ is provided below as a guide. The free ends of the tightening band $e$ pass into holes $a$ in the extended head end $c$ of the shoe sides $b$. A spindle nut $f$ serves to hold in position the ends of the tightening band and to adjust the band.

The raised sides can be provided with a sharp corrugation $k$ which can without causing damage grip the hoof quarters. Provision is made for toe nail-holes $g$ to be fitted in order to secure the shoe in a vertical direction. The shoe can be fitted with a handle for pushing-on and push-on "sponges".

In accordance with the invention a firm fastening and long life are attained without the hoof wall being damaged or cramped.

I claim:—

Horse-shoe which can be fastened to the hoof without the use of nails, comprising a shoe, a prolonged toe-cap and a tightening band therefor, a bent up end of said prolonged toe-cap adapted to receive the middle part of said tightening band, screw threaded members secured to the ends of said tightening band, an adjusting nut adapted to screw onto each of said screw threaded members, a flat bearing surface for said nuts situated in the rear end of the shoe, and a rigid raised side attachment located under the tightening band at each side of the shoe to hold said band clear of the hoof.

MICHEL STEINMETZ.